UNITED STATES PATENT OFFICE.

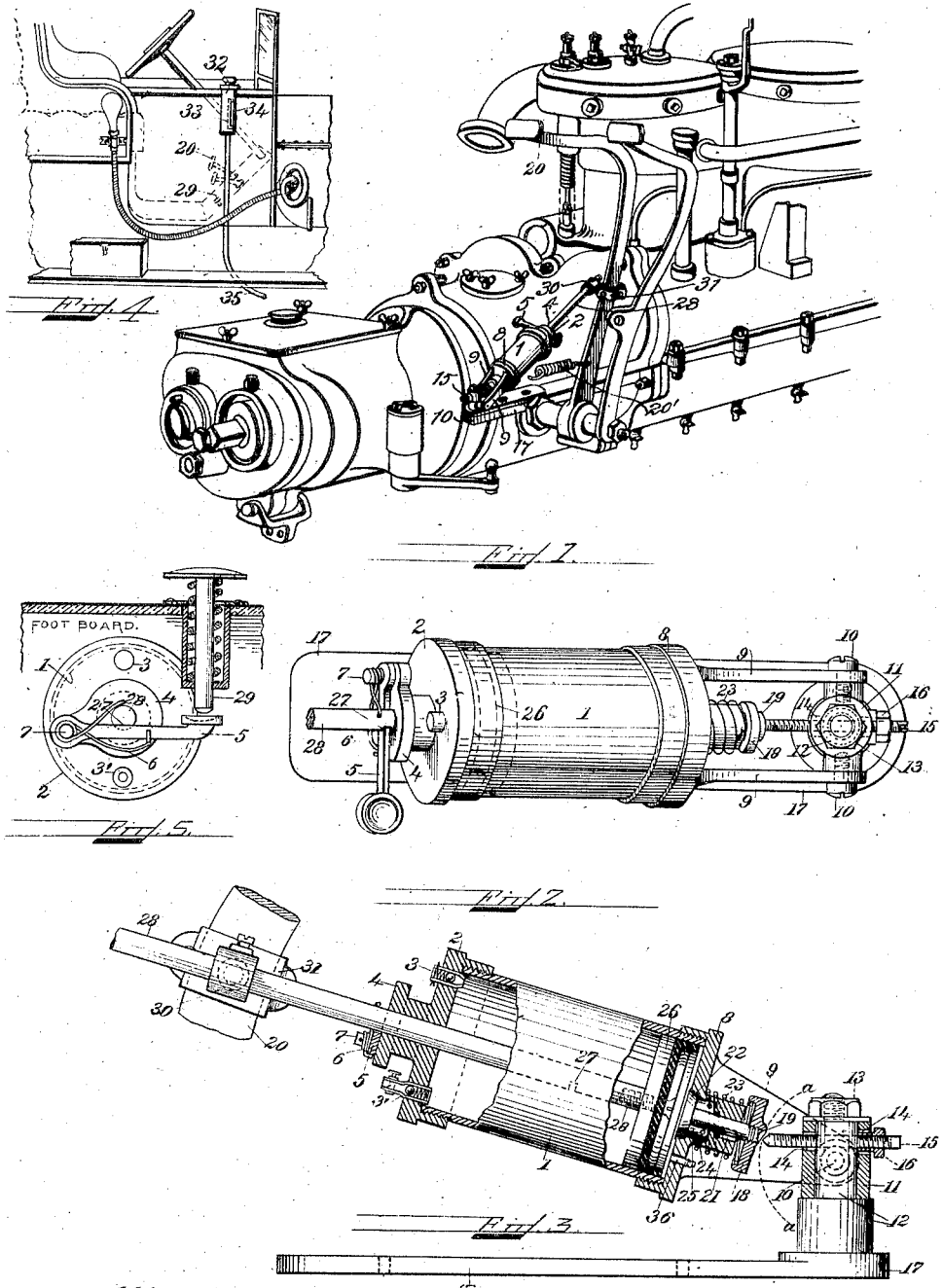

WILLIAM E. EASTMAN, OF BOSTON, MASSACHUSETTS.

AUTOMATIC CLUTCH-LEVER REGULATOR.

1,083,352. Specification of Letters Patent. Patented Jan. 6, 1914.

Application filed October 18, 1911. Serial No. 655,306.

*To all whom it may concern:*

Be it known that I, WILLIAM E. EASTMAN, a citizen of the United States, and a resident of Boston, in the county of Suffolk and State of Massachusetts, have invented certain new and useful Improvements in Automatic Clutch-Lever Regulators, of which the following is a specification.

My invention relates to apparatus to control automatically, the operation of the clutch lever employed in changing the speed of a mechanically driven mechanism, but particularly that for imparting movement to a conveyance, such for example, as a vehicle or boat.

The objects of my invention are, first, to secure a graduated movement to regulate the action of the clutch lever, so as to obviate the concussion likely to result from the ordinary control of the lever, as by foot pressure; and to enable the operator to direct his attention toward governing the movements of the conveyance; and, second, to render and retain the clutch in inoperative position, while the transmission gears are being shifted by the lever to desired speed positions; and, third, to obtain such other objects as may be hereinafter described and claimed. I attain these objects by opposing the spring that returns the clutch lever, and hence the clutch, into operative position, with pneumatically controlled mechanism, whereby when the clutch lever is released, the spring is permitted, 1st, to move with rapidity the clutch lever from its extreme outward position, to a position where the clutch mechanism is about to become engaged; 2nd, to move the lever and clutch with less speed into engagement; and 3rd, to move with still less speed the lever, and hence the clutch, into intimate, and stop in, locking engagement.

In the drawings illustrating the principle of my invention, and the best mode now known to me of embodying it in operative structure, I have shown my invention embodied in an apparatus designed to control the pedal clutch employed in regulating the speed of automobiles.

Figure 1 is a fragmentary perspective of an internal combustion engine, with pedal clutch provided with my invention. Fig. 2 designates a plan of my device in operative position, the clutch lever, not shown, shifted forward with the piston stem locked, and piston at the upper or outward end of the cylinder. Fig. 3 is a side elevation, partly in longitudinal section, with the piston stem released, and piston at the lower or inner end of its cylinder. Fig. 4 denotes an exterior elevation of a part of the vehicle side adjacent to the operator's seat, exhibiting the location of an air lock for making abortive the functions of the regulator whenever desired. Fig. 5 is an end elevation of the cylinder with a regulator actuating device and foot board, in transverse section.

A cylinder 1 has a screw-threaded head 2, provided with valves 3, 3', to control the flow of air into and out of the cylinder, and has an integral projection 4, to which is pivotally attached a lever 5, actuated against foot pressure, by a retaining spring 6 confined to said projection 4 by a stud 7. The foot of the cylinder 1 has a similarly screw-threaded cap 8 provided with integral extensions 9, 9, the end portions of which have trunnion screws 10, 10, pivotally confining and supporting said cylinder 1 to a trunnion sleeve 11 rotatably upheld on a standard 12, and movably secured thereto by a nut 13. Circumferential slots 14, 14, in said sleeves 11, permit the passage therethrough of a stud 15 in screw engagement with the standard 12; said slots permitting a limited rotation of the sleeve 11 about the stud 15, induced by any lateral movement of the clutch lever 20. Adjustment of the stud 15 may be effected by a regulation nut 16. The standard 12 also forms a part of a base plate 17 constituting an anchorage which may be attached to the engine, substantially, as shown in Fig. 1, or in any other suitable manner. Coacting with the end of the stud 15 adjacent to the cylinder 1, Fig. 3, will be observed a plate 18 having a depression 19, the annular rim of which is designed to contact with the point of the stud 15, as the cylinder is caused slightly to oscillate in a vertical plane, on its trunnions 10, 10, by the forward and rearward movements of the clutch lever 20, Figs. 1 and 3; forwardly by foot pressure, and rearwardly by a spring 20', not fully shown but well understood; said contacts occurring at predetermined points in the path of oscillation, represented by the dotted line of motion *a—a*, Fig. 3. The plate 18, and rim are secured to a valve stem of a valve 22, and are held in correct alinement with said stud by a key 21, engaging a portion of the cap 8; the stem of the valve 22 having a seat in said cap. A spring 23 acting against the plate 18, tends to hold the valve 22 in its seat. Air ports 24 lead into a chamber 25 beneath the valve 22. There is a catch slot 27, Figs. 2, 3 and 5, in the piston or connecting rod 28 to engage the latch lever 5, when the foot lever 20 is pushed forward, thus retaining the apparatus in effective working position relative to the action of the clutch lever 20, until the apparatus is released, as by foot pressure through a spring restrained pedal plunger 29, Fig. 5, located in the carriage foot board convenient to the operator. The rod 28 has adjustably secured thereto, a collar 30 pivotally connected to a bracket 31 embracing the clutch lever 20, substantially as appears in Fig. 3; the position of the collar being governed by the stroke required of said rod.

To render abortive the apparatus, should the operator prefer the usual method of manipulating the clutch lever or should the operator desire to have more or less air escape from the cylinder during the piston's inward stroke, to perfect the operation of the regulator, an air lock 32 Fig. 4, preferably situate interiorly of the vehicle side, but, for discernment, is shown exteriorly, comprises a casing having a longitudinal slot 34, inclosing a manually rotatable cylinder provided with an air port 33, said slot and port being normally out of alinement to prevent egress of air from the cylinder of the regulator, communication with which is established by a flexible conduit 35 secured to the open nipple 36.

The operation of my invention may be described as follows:—Assuming the vehicle to be standing, with the engine running, the lever 20, Figs. 1 and 3, is thrust forward by the operator's foot until the piston rod 28 is locked by lever 5, Fig. 5; the friction clutches not illustrated, are now held out of contact, while the transmission gears, not shown, may, at the driver's convenience, be shifted to position to obtain the desired forward speed or the reverse speed. But while the lever 20, piston rod 28 and piston 26, Figs. 1 and 3, are moving forward and outward, the cylinder is moving downward about its pivots or trunnion screws 10, 10, Fig. 3; but during the downward movement of the cylinder the rib 19, if the valve 22 has not already been drawn up off of its seat, by the outward movement of the piston, contacts the point of the stud 15, which, against the action of the spring 23, forces the plate 18, valve stem and valve 22 forward, the latter leaving its seat, and permitting additional air to be drawn in after the piston, through inlet ports 24. In this forward or outward movement of the piston, the air in front of the piston freely passes out through valve 3. The result is that there is no substantial opposition offered to the forward movement of the clutch lever 20. The transmission gears having been shifted, the clutches may be moved into contact by releasing the clutch lever 20, held in forward position by the engagement of the lever 5 and the slot 27 in the piston rod 28, by pedal pressure on the plunger 29, Fig. 5, which actuates the lock lever 5. At this moment of time, the rib 19 of the plate 18 lies below the point of the stud 15, instead of above it as shown in Fig. 3, but upon the release of the clutch lever a spring, not shown, forces the clutch lever rearwardly precipitately, say for two thirds of the length of the stroke of the piston, air following in through the valve 3', while the air in the opposite side of the piston is being compressed. But at this point of the stroke, the rib 19 has moved upwardly in the arc $a$, $a$, come into contact with the point of the stud 15, Fig. 3, and has caused the valve 22 to move up off of its seat, thereby permitting the compressed air to flow out also through the ports 24 until the rib moves up and away from the point of the stud. This additional escape for the compressed air is such that the piston, and hence the clutch lever 20 is moving still slower than when the rib contacted the point of the stud, and the friction clutches are just moving into engagement. After the rib leaves the point of the stud, the valve snaps back into its seat, and the air being again compressed, the piston moves still slower, until the friction clutches are in intimate and operative engagement. It will thus be seen that the clutch lever is permitted to move with great quickness from its extreme outward position to that in which the clutches are about to engage; that the speed of the clutch lever, and hence the speed with which the friction plates of the clutch come into engagement, is still further reduced by the slight escape of air; and, after the plates begin to engage, the speed is even still further reduced by air compression, until the clutch lever and the clutch plates have completed their movements. In this way, a graduated motion for the clutch lever and plates is obtained, whereby there are eliminated, first, all abrupt and concussive actions which are likely to accompany the ordinary method of pedal manipulation by the operator; second, the necessity for the operator to retain his foot in the same position on the rearward movement of the clutch lever 20, as in the initial forward movement, in order to restrain the impetus of an uninterrupted rearward movement, resulting in concussion, noise, and objectionable vibration and shocks to the carriage and its occupants; and third, the attention required in causing the clutch actually to engage, and which can be directed to other matters demanded in propelling an automobile.

By the pneumatic action of the regulator, all the parts of the connected mechanism respond in a manner to avoid the greater resistance and consequent wear of the parts resulting from the ordinary described method of controlling the clutch lever.

If the operator desires to render the regulator inoperative, so that the clutch lever can be operated, as if there were no regulator, he can do so by opening the opening 33, Fig. 4, in the flexible tube 35, connected to the open nipple 36, Fig. 3, by moving it into alinement with the opening 34, Fig. 4. By so doing, the open nipple is opened to the outside air, and a rearward movement of the clutch lever 20, and piston tends to force the air ahead of it, out through the nipple 36, tube 35, and ports 33 and 34. Normally, these parts, and hence the nipple, are closed. If desirable further to control the speed with which the piston, and hence the regulator, operates, the air lock may be opened more or less, as required, to permit more or less air to escape from the cylinder during the inward stroke of the piston, in addition to the escape of air due to the momentary opening and closing of the main valve in the bottom of the cylinder. This feature is of particular value where the regualtor has to be adapted for use in various kinds of clutch mechanism. A regulator without it might be satisfactory on one car but not on another. It is an improvement whereby a fine adjustment of the regulator may be easily and quickly attained.

To prevent the lock lever from engaging the lock slot 27 in the piston rod and thus holding the lock lever in extreme outward position, the spring 6, may be removed. To render the regulator operative again, the openings 33, 34, are again moved out of alinement, the nipple 36 becoming closed to the air, and the spring 6 controlling the lock lever, is restored.

Desiring to protect my invention in the broadest manner legally possible, what I claim is:—

1. In an apparatus for regulating the movement of a lever, an oscillating cylinder having a piston; a piston rod connected to the lever; a valve in the foot of the cylinder, normally closed; and means induced by the oscillation of the cylinder to open and close said valve momentarily before the piston completes the end of its inward stroke.

2. A clutch lever regulator comprising an oscillating cylinder; a piston therein having a piston rod attached to the lever of said regulator; a valve in the foot of said cylinder, normally closed, and means, induced by the oscillation of the cylinder, to open and close said valve momentarily before the end of the inward stroke of the piston to permit enough air to escape to allow the piston to have a differential inward motion.

3. In an apparatus for regulating the movement of a lever, an oscillating cylinder having a piston rod; a supporting base; a stud in said base; a valve in said cylinder; and means on said valve to coact with the stud, to momentarily open and close the valve before the end of the inward stroke of the piston, to permit the escape of air from within the cylinder.

4. A clutch lever regulator comprising an oscillating cylinder; a piston therein having a connecting rod; a spring retained lever; a valve in said cylinder; a plate thereto attached having a depression provided with an annular rim; means independent of the cylinder for actuating said valve at a predetermined point in the path of oscillation of said cylinder.

5. In an automatic regulator embodying a cylinder provided with a piston; a piston rod provided with a catch slot; a clutch lever; means pivotally connecting together, the piston rod, and the clutch lever; means coacting with said slot to automatically confine said piston at a certain interval in its stroke; and means to release said piston at the will of the operator.

6. In an apparatus for regulating the movement of a lever, an oscillating cylinder having a piston; a piston rod connected to the lever; a valve in the foot of the cylinder, normally closed; means induced by the oscillation of the cylinder to open and close said valve momentarily before the piston completes the end of its inward stroke; and an air lock, communicating with the cylinder, whereby additional air may escape from the cylinder, or may be absolutely prevented, during the inward stroke of the piston; all designed to perfect the operative speed of the regulator in connection with a particular clutch mechanism.

7. An automatic regulator embodying a cylinder provided with a piston, and having a piston rod provided with a catch slot and having a collar; a clutch lever; a bracket, thereto attached, and pivotally connected with said collar; means coacting with said slot to automatically confine said piston at a certain interval of its stroke; and means to release said piston at the will of the operator.

8. A clutch lever regulator comprising an oscillating cylinder; a piston therein having a connecting rod pivotally attached to said lever and thereby outwardly actuated; said rod having a slot for its confinement at the end of its outward stroke; and means attached to said cylinder for the release of said rod, by pedal pressure; a valve in the foot of said cylinder normally closed; means induced by the oscillation of the cylinder, to open said valve momentarily admitting air to retard the final action of the piston to secure a differential motion thereof for the purpose specified.

9. In an apparatus for regulating the movement of a lever, an oscillating cylinder having a piston and a piston rod adapted to be automatically secured at a certain interval; a supporting base having a rotatable sleeve provided with slots, limiting its rotation; a stud coacting with the sleeve; a valve in said cylinder; and means on said valve coacting with the stud, to actuate the valve to admit air within the cylinder.

10. A clutch lever regulator comprising an oscillating cylinder; a piston therein having a connecting rod; means for the confinement of said rod at the limit of its outward stroke; a spring retained lever; and means to release said rod; a valve in said cylinder; a plate thereto attached having a depression provided with an annular rim; means, independent of the cylinder, for actuating said valve at a predetermined point in the path of oscillation of said cylinder.

11. In an apparatus for governing the action of a clutch lever, an oscillating cylinder having a piston; a piston rod, secured to said lever which is adapted to move the piston outwardly by pedal action, and inwardly by the movement of said lever; means, connected to said cylinder to admit automatically air thereto, and governed by the oscillations thereof; in combination with an air lock; and means connecting and communicating with said air lock and the compression chamber of the oscillating cylinder, to permit escape of air therefrom, and not retard the movement of the piston, when disuse of the regulator is desired.

In testimony whereof I have affixed my signature, in presence of two witnesses.

WILLIAM E. EASTMAN.

Witnesses:
    Geo. W. Caulkins,
    C. B. Spencer.